March 20, 1934.  W. H. T. HOLDEN  1,951,482
ALTERNATING CURRENT POWER RESERVE SYSTEM
Filed Aug. 20, 1931
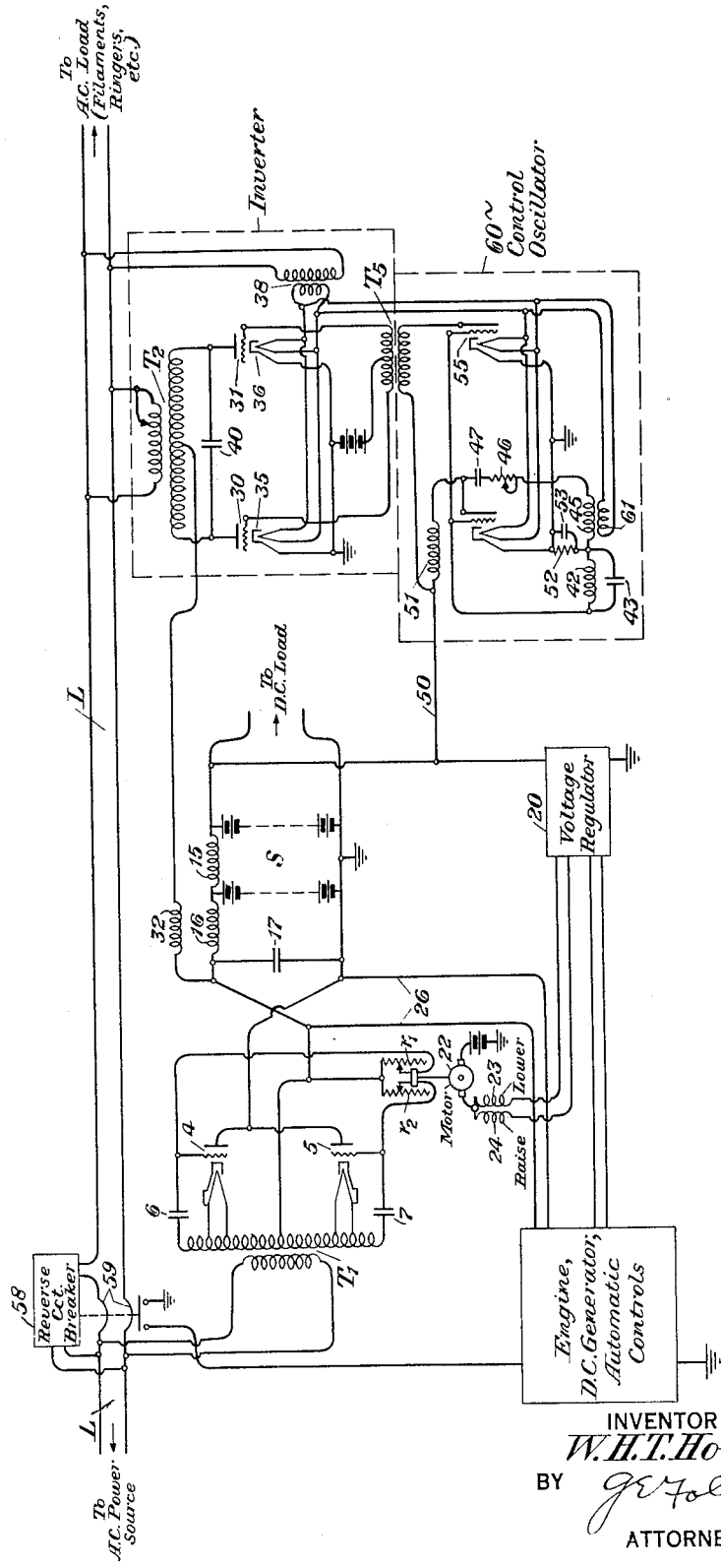
INVENTOR
W.H.T.Holden
BY
ATTORNEY Patented Mar. 20, 1934

1,951,482

UNITED STATES PATENT OFFICE 1,951,482

ALTERNATING CURRENT POWER RESERVE SYSTEM

William Henry Towne Holden, Brooklyn, N. Y., assignor to American Telephone and Telegraph Company, a corporation of New York Application August 20, 1931, Serial No. 558,378

9 Claims. (Cl. 171—97)

This invention relates to an alternating current power reserve system and more particularly to a system for supplying A. C. power to telephone offices or to other similar places in the event that the regular A. C. service is temporarily interrupted. As such it may be called an A. C. storage battery in that it performs the same function as the usual D. C. storage battery does in case of temporary removal of line service.

In telephone offices, as now operated, it is usually necessary to have a continuous supply of A. C. power for certain functions and D. C. power for other functions. The latter of these has been an old need in the art and has commonly been provided by a storage battery of sufficient size to carry the load for short interruptions and charged by rectifiers, or a storage battery combined with an engine-driven direct current generator for longer interruptions, the storage battery carrying the load until the generator has been started and is built up to proper voltage, after which the storage battery again floats on the line.

In many present telephone installations, certain parts of the system are made to be supplied with A. C. power such as ringing generators, filaments of vacuum tubes, etc., and these will not function properly on D. C. It is necessary, therefore, to provide such A. C. supply when the line service is interrupted and to this end I provide a system comprising an incoming A. C. power line which supplies the necessary power to such parts as require A. C. and which at the same time charges a storage battery by means of a rectifier to supply the necessary D. C. At the same time, I provide an inverter by means of which D. C. power from the storage battery is converted into A. C. power of substantially the same frequency and voltage as the original line supply and impressed on the line. The frequency of the inverter may be maintained by a separate oscillator such as a vacuum tube oscillator. In order to insure readiness to take a load very quickly this inverter is in operation continuously and in order, further, to insure that the supply from the inverter shall be in phase with the service voltage at the time the service fails, I prefer to control the oscillator mentioned above by the service line voltage. Finally, in my system I provide also an auxiliary engine and D. C. generator which will start automatically on failure of service power and will keep the storage battery charged to the correct voltage.

The invention as thus described in brief will be better understood by reference to the following specification and the accompanying drawing in which the figure is a circuit diagram of my system.

In said figure, there is shown an incoming A. C. power line L of, say, 220 volts which feeds directly to the A. C. load and which, at the same time, supplies power to a rectifier for charging a storage battery. The essential details of this rectifier and storage battery are shown in the figure in which the transformer $T_1$ supplies the necessary voltage to any suitable rectifier. In this drawing, I have, for illustrative purposes, shown a thyratron rectifier comprising the thyratrons 4 and 5, the midpoint of the secondary of the transformer $T_1$ being connected through any suitable load (in this case the storage battery) to the plates or anodes of the two tubes. The filaments of these tubes are shown as being supplied with heating current from suitable taps on the secondary of the transformer and these filaments may be the cathodes of the tubes or, as I have shown in this drawing, they may be used for heating indirectly cathode elements which surround the filaments in a manner well known in the art. In my circuit, I have shown these cathodes as being connected to the filaments. The power output of such a thyratron rectified system may be controlled in a number of different ways, the manner which I have shown consisting of potential control of grids in the said tubes each grid being connected to its filament through a condenser 6 and a portion of the secondary of the transformer $T_1$. By changing the phase of the grid potential with respect to the filament, the output of the thyratron can be controlled and the method I here use for such control is by means of a resistance $r_1$ and $r_2$ shunted from the respective grids to the midpoint of the secondary of transformer $T_1$. By changing the value of this resistance $r_1$, as indicated in the figure, the phase of the voltage of the grids may be controlled for the purpose set forth, which, in this case, is to supply the necessary voltage for charging the storage batteries S. The output voltage of such a rectifier, as is well known, will be subject to considerable fluctuation and it is highly important that the D. C. voltage supplied by the storage battery to the D. C. load shall be as nearly free from ripple as possible. To this end, I divide the storage battery, which may be of any suitable voltage such as the 130 volts commonly used in telephone offices, into two equal parts in parallel, these two portions being separated by a choke coil 15 and having at the same time, between the first battery and rectifier, a choke 16. In addition, there is bridged across the output of the rectifier a fairly large condenser 17. Such a system acts as an excellent filter and the voltage supplied to the D. C. load is very well freed from undesirable ripple.

I provide automatic means for changing the resistances $r_1$ and $r_2$ to adjust the output of the rectifier and for this purpose I may use any voltage regulating device such as shown at 20. This voltage regulator, for example, may be a voltmeter relay which controls the circuit of a motor 22 through the field coils 23 and 24 to rotate the motor in the one direction or the other, thus increasing or decreasing the resistances $r_1$ and $r_2$.

In addition to the above, I have shown an auxiliary engine and D. C. generator with automatic controls, these being of any suitable form such as now known in the art and being so connected that when the service voltage is off, suitable circuits will be closed to start the engine and bring the D. C. generator to its proper voltage, whereupon the said generator takes up the function of charging the storage battery S through conductors 26. The necessary connections would also be included to stop the engine and generator when the service line again becomes active. It is, of course, desirable that there should be voltage regulation of the D. C. generator and this may be accomplished in any desired manner by control from the voltage regulator 20.

As thus far described, the system is capable of supplying D. C. power to the proper load quite independently of the presence or absence of service line voltage. But, as stated above, I desire to provide means to supply A. C. voltage to that portion of the load which calls for A. C. power, even though the service line may be off. To this end, I have shown an inverter which is a device for converting D. C. current power into A. C. power, the D. C. power being supplied from the storage battery S. While a number of different types of inverters might be used, the one which I have shown and will describe in this specification consists of two thyratron tubes 30 and 31, the plates of which are connected to the terminals of one winding of a transformer $T_2$, the midpoint of this winding being connected to the ripple or noisy side of the storage battery S through a suitable choke 32. As in the case of the rectifier tubes, I have shown thyratrons with indirectly heated cathodes 35 and 36, these being connected in parallel to ground. The filaments are heated by means of a step-down transformer 38 which takes power directly from the line L. The secondary of the transformer $T_2$ is bridged directly across the line and by means thereof any A. C. power developed by the inverter is impressed on said line. The frequency of the A. C. power thus generated is controlled by a number of factors, chief of which is the capacity of the condenser 40 bridged across the primary winding of transformer $T_2$ and the various elements are so adjusted that this frequency will be quite close to that of the power line which may be 60 cycles. However, within reasonably wide limits, the output frequency of this inverter may be controlled by an independent frequency impressed on the grids of the tubes, the connections being such that the two grids are charged in opposite phase by the independent source. For such independent control, I make use of an oscillator, the natural frequency of which is substantially that of the line frequency, say, 60 cycles. This oscillator may be of any of the well known types, the one which I have shown here consisting of a three-element tube with direct or indirect heating of the cathode and having connected from filament to grid a tuned circuit consisting of inductance 42 and condenser 43. Inductively coupled to this tuned circuit is the inductance 45 connected from filament to plate through a resistance 46 and condenser 47. The plate itself is supplied with D. C. power from the storage battery over the line 50 in series with the choke 51. Suitable bias is supplied to the grid of this tube by resistance 52 in series with the cathode, the said resistance being shunted by condenser 53 to give a low impedance path for the generator oscillations. The element 47 serves as a blocking condenser for D. C. current and the adjustable resistance 46 makes it possible to limit the amplitude of the generator oscillations, chiefly for the purpose of preventing an excessive generation of harmonics. The oscillations thus produced may be impressed directly upon the grids of the tubes 30 and 31. But, in order to prevent undesirable reaction on the oscillator, I prefer to supply the oscillations to an amplifier 55, the cathode of which is connected to the cathode of the oscillator tube, the grid of which is connected directly to the grid of the oscillator tube and the plate of which is connected through the primary of transformer $T_5$ to the positive side of the storage battery. The filaments of both of these tubes are also supplied with heating current from the transformer 38.

With the circuit as thus set up, oscillations corresponding to the natural frequency of the oscillator will be impressed upon the grids of the inverter thus controlling the frequency of the output of said inverter and maintaining it in synchronism with the oscillator impulses, which impulses may be adjusted as closely as desired to the frequency of the service supply.

Under these circumstances, it will be noted that the inverter would be functioning continuously to supply an A. C. voltage to the line; but, by suitable adjustment of the output of the transformer $T_2$, the voltage will be such that substantially no power is supplied to the line so long as the service supply is present. When, however, such supply is off, the inverter immediately takes on the A. C. load consisting of ringing generators, filaments, etc. In order to limit the network to which such inverter power is supplied, that is, to keep the inverter from feeding power back into the supply network, I have placed in the line a reverse power circuit breaker 58 which opens the line by the switch 59 as soon as the inverter starts to take the load; but, which circuit breaker will immediately close when the service voltage returns, whereupon, the said service supply again takes on its former load.

I find it quite important that, at the time the inverter takes on the load, the voltage which it generates shall be in phase with the service voltage. To this end, I control the phase of the oscillations of the small oscillator by power taken from the line, this being accomplished by the coil 61 bridged from the transformer 38 and coupled to the coils 42 and 45 of the oscillator. Thus, it will be seen that even though the natural frequency of this oscillator may not be identically that of the service line it would be maintained at this frequency and in phase with it through the coil 61 and so the output of the inverter is also maintained in exact synchronism and phase with the service supply.

After this supply is off, the oscillator will then oscillate at its own natural frequency, but, even with the best of regulation, it could not be expected that when the service voltage returns there would be exact phase agreement. It is desirable, however, that such phase agreement should be established in a very short time and a number of methods may be used for this purpose. One method which would be appropriate is to have the natural frequency of the oscillator different from that of the service supply by a small amount, say, one per cent. So long as the service supply is present, the oscillator would be maintained in proper phase and, after it is cut off, the slight difference of one per cent. or thereabouts would not interfere with the proper functioning of the A. C. load. This slight difference, however, assures that after the service is restored, phase agreement will come about in the short interval of time of one second or less, whereupon the load will be removed from the inverter and the oscillator maintained thereafter in proper phase adjustment.

While I have referred specifically to the application of this A. C. reserve system to the peculiar requirements of a telephone station, it is to be understood that its application is not to be restricted thereto but that it is applicable to any analogous situation. Also, it is to be understood that while I have not shown any details of the engine and D. C. generator with its control, any of a large number of combinations of relays and other elements may be combined in manners now well understood in the art to start the engine by drawing power from the storage battery, to regulate the voltage and to stop the engine.

What is claimed is:

1. An A. C. reserve power system comprising an A. C. power line and normally supplying power to an A. C. load, a rectifier with its input terminals connected to said power line, a storage battery connected to the output of the rectifier for charging, an inverter supplied wtih power from the storage battery for generating A. C. power when the normal A. C. source is off, the inverter being connected to the A. C. load at all times and in such condition as to take over the load instantly without the intermediary of mechanical switching and in proportion as the normal A. C. source fails to supply power.

2. An A. C. reserve power system comprising an A. C. power line normally supplying power to an A. C. load, a rectifier with its input terminals connected thereto, a storage battery connected to the output of the rectifier for charging, an inverter supplied with power from the storage battery for generating A. C. power when the normal A. C. source is off, and means for supplying the inverter with power continuously from the rectifier and battery while the normal A. C. source is effective, the inverter being continuously operating and continuously connected to the A. C. load but supplying appreciable power only when the normal A. C. source is off.

3. The combination of claim 1 characterized by the fact that there is a reverse power circuit breaker to limit the portion of the network to which the inverter supplies power to the A. C. load circuit while the normal A. C. supply is off.

4. An A. C. reserve power system comprising an A. C. power line normally supplying power to an A. C. load, a rectifier with its input terminals connected thereto, a storage battery connected to the output of the rectifier for charging, an inverter supplied with power from the storage battery for generating A. C. power when the normal A. C. source is off, an oscillator of substantiallly the frequency of service voltage connected to the inverter to control the frequency of the inverter output.

5. The combination of claim 4 characterized by the fact that the oscillator is controlled by and kept in phase with the service voltage while said service voltage is present.

6. The combination of claim 2 characterized by the fact that there is an auxiliary engine and D. C. generator to supply power to the storage battery and the inverter when the service voltage is off for an extended period.

7. The combination of claim 2 characterized by the fact that there is an auxiliary engine and D. C. generator to supply power to the storage battery and the inverter when the service voltage is off, and further characterized by an automatic voltage regulating means connected to the rectifier and to the D. C. generator to control the voltage delivered by each of these.

8. The combination of claim 2 characterized by the fact that there is an oscillator of substantially the frequency of service voltage, this oscilaltor being connected to the inverter to control the frequency of the inverter output.

9. The combination of claim 2 characterized by the fact that there is an oscillator of substantially the frequency of service voltage, this oscillator being connected to the inverter to control the frequency of the inverter output, and further characterized by the fact that the oscillator is controlled by and kept in phase with the service voltage while said service voltage is present, the oscillator having a natural frequency slightly different from the service frequency.

WILLIAM H. T. HOLDEN.